US006895240B2

(12) United States Patent
Laursen et al.

(10) Patent No.: US 6,895,240 B2
(45) Date of Patent: May 17, 2005

(54) METHOD AND ARCHITECTURE FOR MANAGING A FLEET OF MOBILE STATIONS OVER WIRELESS DATA NETWORKS

(75) Inventors: Andrew L. Laursen, San Mateo, CA (US); Maurice A. Jeffery, Los Altos, CA (US)

(73) Assignee: Openwave Systems Inc., Redwood City, CA (US)

( * ) Notice: Subject to any disclaimer, the term of this patent is extended or adjusted under 35 U.S.C. 154(b) by 540 days.

(21) Appl. No.: 09/906,633

(22) Filed: Jul. 16, 2001

(65) Prior Publication Data

US 2001/0041556 A1 Nov. 15, 2001

Related U.S. Application Data

(63) Continuation of application No. 09/114,588, filed on Jul. 13, 1998, now Pat. No. 6,292,657.

(51) Int. Cl.$^7$ .................................................. H04Q 7/20
(52) U.S. Cl. ..................... 455/420; 455/411; 455/412.1
(58) Field of Search ................................. 455/418, 419, 455/420, 411, 432.3, 412.1, 413

(56) References Cited

U.S. PATENT DOCUMENTS

| | | |
|---|---|---|
| 5,371,794 A | 12/1994 | Diffie et al. |
| 5,420,606 A | 5/1995 | Begum et al. |
| 5,450,071 A | 9/1995 | DeLuca et al. |
| 5,523,794 A | 6/1996 | Mankovitz et al. |
| 5,524,135 A | 6/1996 | Mizikovsky et al. |
| 5,526,401 A | 6/1996 | Roach, Jr. et al. |
| 5,546,444 A | 8/1996 | Roach, Jr. et al. |
| 5,806,044 A | 9/1998 | Powell |
| 5,809,415 A | 9/1998 | Rossmann |

(Continued)

FOREIGN PATENT DOCUMENTS

| | | |
|---|---|---|
| EP | 0612019 A2 | 8/1994 |
| EP | 0779759 A2 | 6/1997 |
| EP | 1077437 A2 | 2/2001 |
| WO | WO 89/02628 A1 | 3/1989 |
| WO | WO 97/23838 | 7/1997 |
| WO | WO 97/41654 | 11/1997 |
| WO | WO 98/44477 A1 | 10/1998 |

OTHER PUBLICATIONS

Tso et al. "Always On, Always Connected Mobile Computing," pp. 918–924, 1996, XP–002165763.
HDML 2.0 Language Reference, Version 2.0, pp. 1–56, Redwood Shores, CA, Unwired Planet, Inc., Jul. 1997.
HDTP Specification, Version 1.1–Draft, pp. 1–40, Redwood Shores, CA, Unwired Planet, Inc., Jul. 15, 1997.

Primary Examiner—Nay Maung
Assistant Examiner—Philip J. Sobutka
(74) Attorney, Agent, or Firm—Blakely, Sokoloff, Taylor & Zafman LLP

(57) ABSTRACT

The present invention discloses a fleet managing system in which fleet data can be securely managed and disseminated to a selective group of mobile stations serviced by a carrier infrastructure. The fleet managing system relies on a series of consecutive transitive trusts between pairs of components in the system so that all communications from a provisioning entity to the mobile stations are secure. The access to the fleet managing system is guarded with a challenge response every time there is a request arriving at the system while the mobile stations are verified by an account manager in the system to ensure that the fleet data is eventually pushed to the correct group of mobile stations. Apart distinctly from existing fleet managing systems for mobile stations, the present invention provides secure means for an authorized entity, from anywhere at any time, to control the dissemination of mobile data to a specified group of mobile stations without incurring additional costs to or direct involvement of a service carrier.

33 Claims, 10 Drawing Sheets

U.S. PATENT DOCUMENTS

| | | |
|---|---|---|
| 5,855,007 A | 12/1998 | Jovicic et al. |
| 5,862,475 A * | 1/1999 | Zicker et al. ............... 455/419 |
| 5,872,926 A | 2/1999 | Levac et al. |
| 5,878,337 A | 3/1999 | Joao et al. |
| 5,890,075 A | 3/1999 | Cyr et al. |
| 5,918,158 A | 6/1999 | LaPorta et al. |
| 5,918,211 A | 6/1999 | Sloane |
| 6,014,429 A | 1/2000 | LaPorta et al. |
| 6,040,784 A | 3/2000 | Miller |
| 6,078,820 A | 6/2000 | Wells et al. |
| 6,138,009 A * | 10/2000 | Birgerson ................... 455/419 |
| 6,292,657 B1 | 9/2001 | Laursen et al. |
| 6,311,058 B1 * | 10/2001 | Wecker et al. ............. 455/418 |

* cited by examiner

| Device ID | Subscriber ID | Group ID | User Info |
|---|---|---|---|
| 6508171453 | 8612345667-10905_pn.mobile.att.net | C | (CDPD, GSM ....) |
| 204.213.5.56 | 8531311117-10905_pn.mobile.att.net | D | (GSM .... ) |
| ••• | ••• | ••• | ••• |

*Fig. 4*

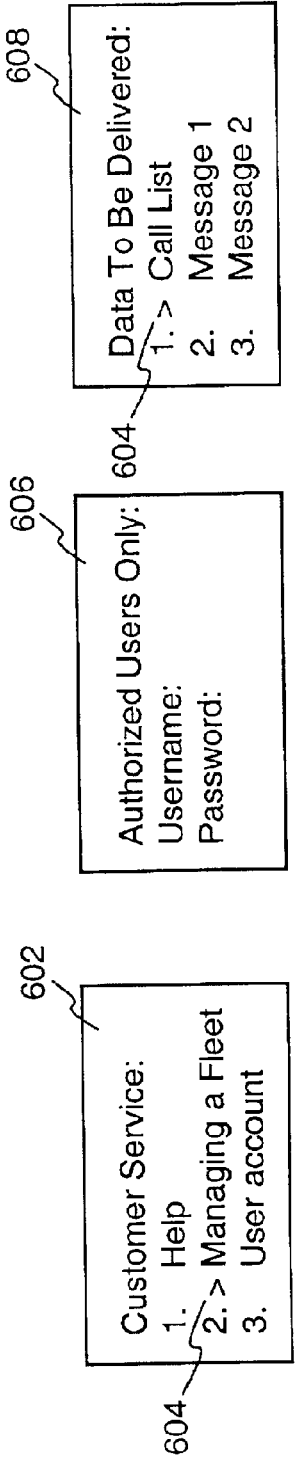

METHOD AND ARCHITECTURE FOR MANAGING A FLEET OF MOBILE STATIONS OVER WIRELESS DATA NETWORKS

The present application is a continuation of application Ser. No. 09/114,588, filed on Jul. 13, 1998 now U.S. Pat. No. 6,292,657, which is hereby incorporated herein by reference.

BACKGROUND OF THE INVENTION

1. Field of Invention

This invention relates to management of wireless mobile stations and more particularly relates to a method and architecture for managing a selective set of mobile devices or stations via secure communication systems.

2. Description of the Related Art

Two-way interactive communication mobile devices are among the fastest emerging communication devices that enable users to receive, collect, analyze, review and disseminate information as they travel or move about. The new mobile devices combine voice, data, and personal digital assistant (PDA) functionalities into a single portable device that provides not only the convenience of making phone calls but also the capability of accessing a myriad of public and enterprise information services in the Internet from anywhere at anytime. It is evident that the evolution of the mobile devices has been fueled by the demand for immediate access to information and made possible by the convergence of computing and communications technologies.

The essence of the services to the mobile devices provided by service providers (carriers) is the production and dissemination of mobile data including voice and messages over wireless communication networks. Many service providers offer various services through the devices, such as timed delivery of subscribed information, user accessible customer cares and customized group communications. To facilitate convenient uses of the services, the service providers need to set up human-staffed call centers or interactive response systems, allowing users to call in, for example, to inquire account information, request service changes or send specific information to a particular group of users. In a wireless environment, however, the call-in requests and facilities incur tremendous overhead costs to the service providers.

There is, therefore, a great need for a generic solution that provides the convenience of the services but without incurring substantial costs to the service providers. For example, an entity that may be a user or a corporation wants to update a call list to a selective group of the mobile devices so that a group call can be made within the group. Rather than asking a service provider to update the call list every time there is a change to the list, it is desirable for the entity to update and disseminate the list to a selective group of mobile devices through a secure communication means whenever the entity desires. There is a more practical example; a corporation wants to propagate an urgent proprietary message to its sale team on customer sites provided that the team members each have such mobile device. From the business perspective of the corporation, it is preferable or more secure for the corporation to directly broadcast the message to its sales team rather than forwarding the message to the service provider for further distribution. This leads to the need of secure management of mobile devices by an authorized entity over a secure communication means through which the authorized entity can disseminate or push mobile data to a selected group of mobile devices via the infrastructure of a service provider.

SUMMARY OF THE INVENTION

The present invention has been made in consideration of the above described problems and has particular applications to secure management of mobile devices or stations by an authorized entity that may be a carrier, a business, a corporation or an individual. Practically there are many applications that need to immediately distribute information to a number of selective users through the mobile devices. The information, collectively referred to as mobile data or fleet data, may include, but not be limited to, commercial information, proprietary message and group call lists and typically is concerned to certain users. Distinct from existing fleet managing systems for mobile stations, the present invention provides secure means for an authorized entity to control the dissemination of mobile data to a specified group of mobile stations via a carrier infrastructure but without incurring substantial costs to the carrier. Further, by virtue of the present invention, the authorized entity can access the fleet managing systems from anywhere at anytime.

To ensure authorized and authenticated access to the mobile station managing system, according to one aspect of the present invention, the mobile station managing system relies on a series of consecutive transitive trust between pairs of components therein so that the access to the system and data management are always secure. This is provided by using secure communication protocols and multiple verifications and authentication among all the components.

According to one embodiment, the present invention is an architecture for securely managing a plurality of mobile stations, the architecture comprising:

a carrier infrastructure providing a radio link to the plurality of the mobile stations over a wireless data network using a first communication protocol;

a fleet managing system coupled to the carrier infrastructure, the fleet managing system comprising a proxy server, the proxy server further comprising
an account manager managing a plurality of user accounts, each corresponding to one of the mobile stations; and
a proxy server module;
a memory receiving fleet data;
a provisioning interface providing secure access to the memory;
wherein the provisioning interface receives a request to push the fleet data in the memory to the plurality of the mobile stations, and
wherein the proxy server module pushes the fleet data, via the carrier infrastructure, to the plurality of the mobile stations over the wireless data network after the request is authenticated by the provisioning interface and verified by the account manager.

According to another embodiment, the present invention is a method for securely managing a plurality of mobile stations serviced by a carrier infrastructure, the method comprising:

sending a request from a provisioning entity to push fleet data to the plurality of the mobile stations;

receiving a challenge response from a fleet managing system in response to the request;

accessing the fleet managing system by supplying correct credential information to the challenge response;
wherein the fleet managing system comprises:
an account manager managing a plurality of user accounts, each corresponding to one of the mobile stations;

a proxy server module;

a memory; and a provisioning interface providing secure access to the memory;

preparing the fleet data to be received in the memory;

determining the plurality of the mobile stations verified by the account manager with the plurality of the user accounts; and executing the request to cause the fleet data pushed by the proxy server module to the plurality of the mobile stations.

Accordingly, an important object of the present invention is to provide secure means for an authorized entity to control the dissemination of mobile data to a specified group of mobile stations from anywhere at any time.

Other objects, together with the foregoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 4 illustrates an exemplary layout of a plurality of user accounts in a proxy server that services a plurality of mobile stations, each of the mobile stations corresponding to one of the user account in the proxy server;

FIGS. 6A–6E depicts, respectively, exemplary displays to illustrate procedures of executing a fleet data request from accessing the provisioning entity, answering a challenge response, accessing fleet data, determining a fleet group finally to executing the request.

DETAILED DESCRIPTION OF THE INVENTION

Notation and Nomenclature

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

The detailed descriptions of the present invention in the following are presented largely in terms of procedures, steps, logic blocks, processing, and other symbolic representations that resemble of data processing devices coupled to networks. These process descriptions and representations are the means used by those experienced or skilled in the art to most effectively convey the substance of their work to others skilled in the art. The present invention is a method and architecture for managing a fleet of mobile stations over wireless data networks. The method along with the architecture to be described in detail below is a self-consistent sequence of processes or steps leading to a desired result. These steps or processes are those requiring physical manipulations of physical quantities. Usually, though not necessarily, these quantities may take the form of electrical signals capable of being stored, transferred, combined, compared, displayed and otherwise manipulated in a computer system or electronic computing devices. It proves convenient at times, principally for reasons of common usage, to refer to these signals as bits, values, elements, symbols, operations, messages, terms, numbers, or the like. It should be borne in mind that all of these similar terms are to be associated with the appropriate physical quantities and are merely convenient labels applied to these quantities. Unless specifically stated otherwise as apparent from the following description, it is appreciated that throughout the present invention, discussions utilizing terms such as "processing" or "sending" or "verifying" or "displaying" or the like, refer to the actions and processes of a computing device that manipulates and transforms data represented as physical quantities within the computing device's registers and memories into other data similarly represented as physical quantities within the computing device or other electronic devices.

The Preferred Embodiment

Figure 1:
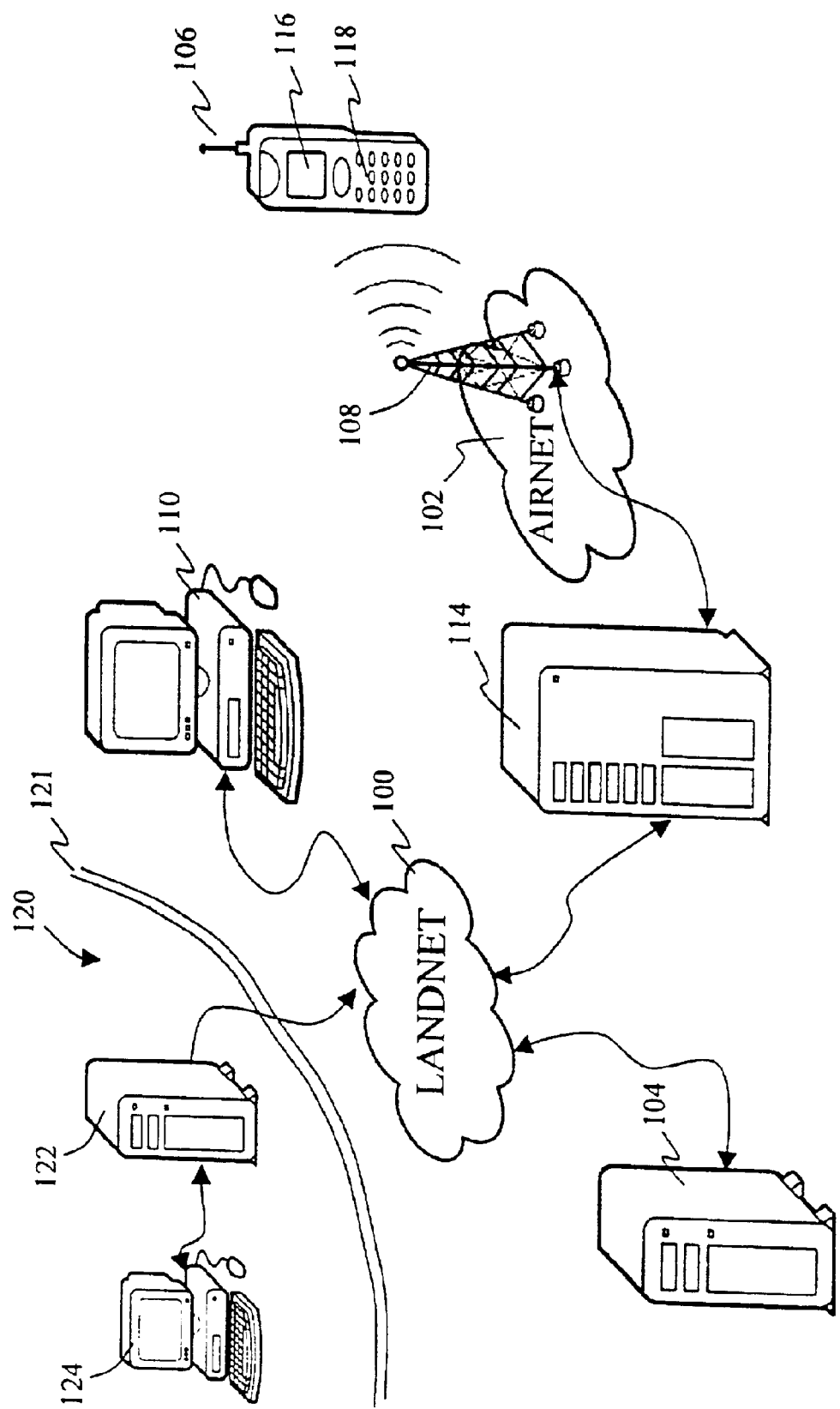
FIG. 1 shows a schematic representation of a data network in which the present invention may be practiced.

Refer now to the drawings, in which like numerals refer to like parts throughout the several views. FIG. 1 illustrates a schematic configuration in which the present invention may be practiced. Landnet 100 is a landline network that may be the Internet, the Intranet and a data network of other private networks. Coupled to landnet 100 are a personal computer (PC) 110 and a network server 104. Personal computer 110 may be a Pentium II-based desktop personal computer. Preferably, personal computer 110 runs a HyperText Markup Language (HTML) browser, such as Netscape Navigator from Netscape Communications Corporation (http://www.netscape.com/) via landnet 100 using HyperText Transfer Protocol (HTTP) to access information store in network server 104 that may be a workstation from SUN Microsystems Inc (http://www.sun.com/). The information stored in network server 104 may be hypermedia information including fleet data.

As the present invention concerns secure delivery of information by an authorized entity via a secure communication system to a selective set of mobile stations or devices, the fleet data used herein means mobile data or information transportable in the secure communication system. Further the selective set of mobile stations is sometimes referred to as a fleet of mobile stations sharing the same fleet data. The fleet data may include, but not necessarily limited to, a call list, alphanumeric messages, priority levels of the fleets, encryption information, a list of fixed control points and default values to affect the mobile stations. It will be soon appreciated that the contents or functions in the fleet data do not affect the operations of the present invention. One of the key features in the present invention is the secure delivery of the fleet data to a desired fleet.

Also shown in FIG. 1 is a private network 120 including a computer 124 and a server 122, private network 120 is protected by a firewall 121 protecting resources of the private network from users on other networks. Private network 120 is typically used in a corporate configuration in which secure information is kept in server 122 and accessible only by computing devices, such as computer 124, on private network 120.

Serviced by airnet 102 are a number of two-way wireless interactive communication devices, referred to as mobile stations herein, though only one representation 106 is shown in FIG. 1. Mobile station 106 is one of those two-way interactive communication devices that include, but are not limited to, cellular phones, palm-sized personal assistant devices and Internet-capable appliance controllers and capable of communicating wirelessly with antenna 108 via airnet 102. For simplicity, antenna 108 also represents a wireless carrier infrastructure that generally comprises a base station and an operations and maintenance center. The base station controls radio or telecommunication links with the mobile stations. The operations and maintenance center comprises a mobile switching center performing the switching of calls between the mobile stations and other fixed or mobile network users. Further the operations and maintenance center manages mobile account services, such as authentication and oversees the proper operation and setup of the wireless network. Each of the hardware components and processes in carrier infrastructure 108 are known to those skilled in the art and not to be described herein to avoid unnecessarily obscuring aspects of the present invention.

Between landnet 100 and airnet 102 there is a server device 114 functioning as a bridge between a landnet and an airnet and generally referring to as a proxy server which, also referred to as link server or network gateway server or wireless data server. Proxy server 114 may be a workstation or a personal computer. Generally, the communication protocol in airnet 102 is different from that in landnet 100. Hence, one of the functions proxy server 114 performs is to map or translate one communication protocol to another, thereby mobile station 106 coupled to airnet 102 can communicate with any of the devices coupled to landnet 100 via proxy server 114.

According to one embodiment, the communication protocol in the Internet 104 is the well known HyperText Transfer Protocol (HTTP) or HTTPS, a secure version of HTTP, that runs on TCP (Transmission Control Protocol) and controls the connection of the HTML web browser in, for example, PC 110 to server 104, and the exchange of information therebetween. The communication protocol between mobile station 106 and proxy server 114 via airnet 102 is Handheld Device Transport Protocol (HDTP) (formerly known as Secure Uplink Gateway Protocol (SUGP)), which preferably runs on User Datagram Protocol (UDP) and controls the connection of an HDML web browser in mobile station 106, to proxy server 114, where HDML stands for Handheld Device Markup Language and used to be called "TIL" (terminal interaction language). HDML, similar to HTML, is a tag based document markup language and comprises a set of commands or statements specified in a card that specifies how information displayed on a small screen 116 of the mobile station 106. Normally a number of cards are grouped into a deck that is the smallest unit of HDML information that can be exchanged between the mobile station 106 and proxy server 114. The specifications of HDTP, entitled "HDTP Specification" and HDML, entitled "HDML 2.0 Language Reference" are enclosed and incorporated herein by reference in their entirety.

It should be noted that HDTP is a session-level protocol that resembles HTTP but without incurring the overhead in HTTP and is highly optimized for use in thin devices, such as the mobile stations, that have significantly less computing power and memory than that in a desktop personal computer. Further it is understood to those skilled in the art that UDP does not require a connection to be established between a client and a server before information can be exchanged, which eliminates the need of exchanging a large number of packets during session creation between a client and a server. Exchanging only a very small number of packets during a transaction to effectively interact with a landline device is one of the desired features for a mobile station with very limited computing power and memory.

Figure 2A:
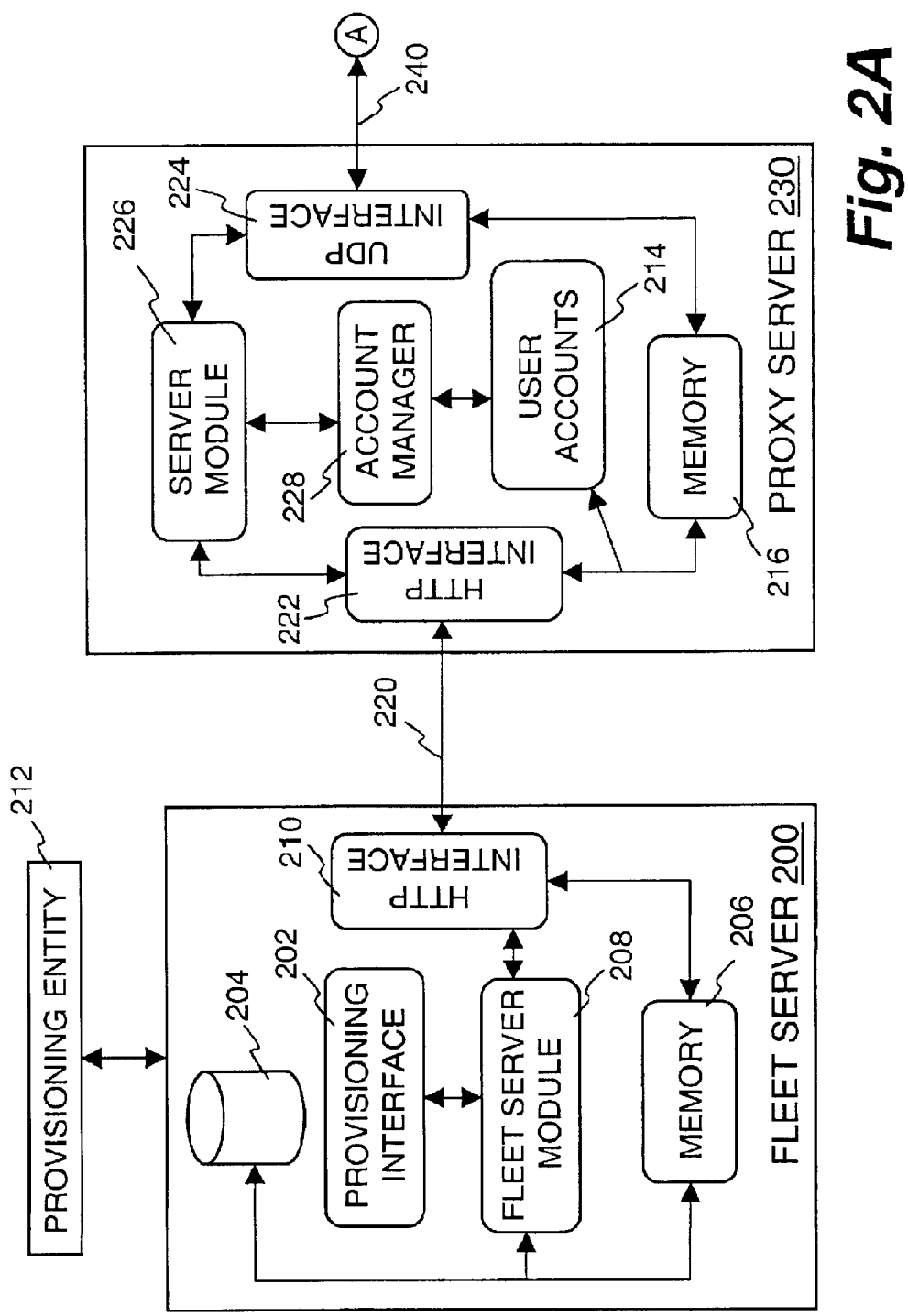
FIGS. 2A and 2B demonstrates the system architecture of the fleet managing system of the present invention.
Figure 2B:
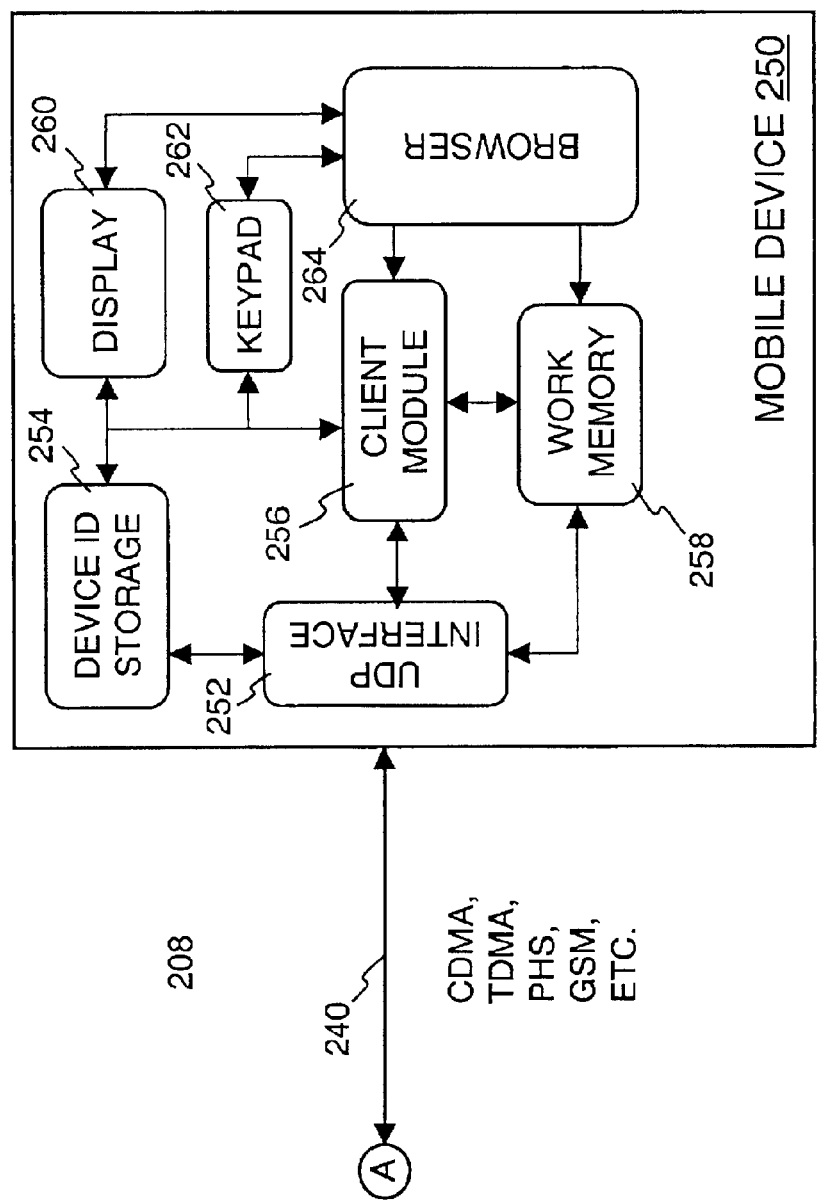

FIGS. 2A and 2B illustrate block diagrams of the essential components in the present invention. Referring now to FIG. 2A, there is shown functional block diagrams of fleet server 200 and proxy server 230 in the present invention according to one embodiment thereof. Fleet server 200 and proxy server 230, which represent servers 104 and 114 of FIG. 1, respectively, are typically a server computer and communicate directly or through a landnet. To be more specific, fleet server 200 and proxy server 230 function independently and can be physically, separately and remotely located or in one server computer depending on actual implementation preference without affecting the operations of the disclosed invention herein.

When fleet server 200 and proxy server 230 are physically and separately located, both, coupled to the landnet, can communicate using a mutually agreed communication protocol, e.g. HTTPS. When fleet server 200 and proxy server 230 are implemented in a single server computer, both are directly coupled. Hence, communication path 220 may represent the landnet or a direct communication path depending on the actual configurations of fleet server 200 and proxy server 230. The following description is based on fleet server 200 and proxy server 230 being separate apparatus but implies no limitations to the particular configurations thereof.

Fleet server 200 may be viewed as a gatekeeper through which it is possible to make a change to a fleet database or assign a particular set of data and then push the appropriate changes or set of data to a fleet of mobile stations. Generally fleet server 200 comprises a provisioning interface 202, a database 204, memory 206 and fleet server module 208.

Figure 3:
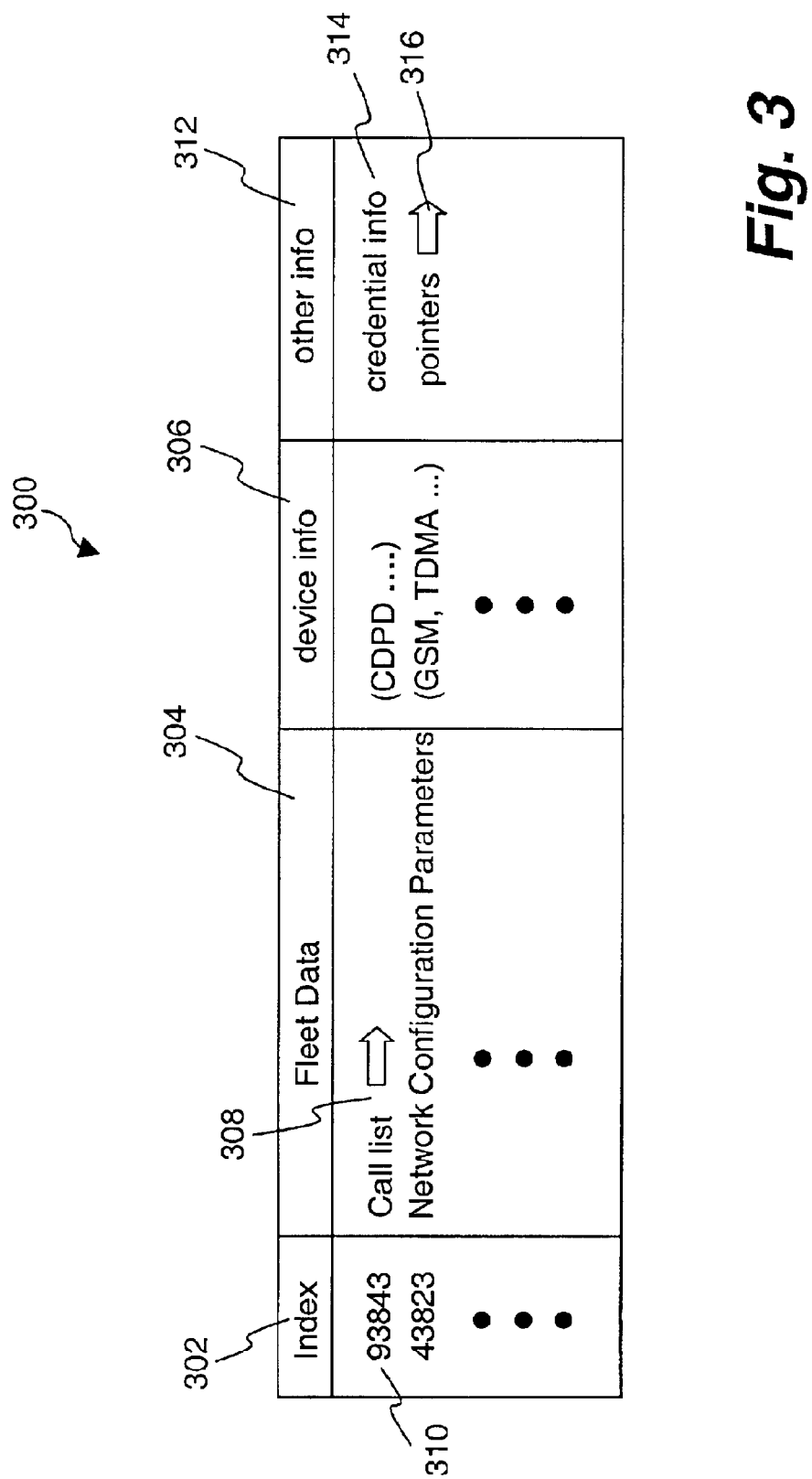
FIG. 3 illustrates an exemplary layout of fleet data represented in a database used in one embodiment of the present invention.

Database 204 comprises typically a plurality of sets of fleet data information including information that provides additional or different utility to the mobile stations if the data is received therein. FIG. 3 depicts an exemplary list of fleet data 300 used to describe FIGS. 2A and 2B according to one embodiment. Index 302 shows a list of available request entries that are desirable for certain mobile stations. For example, entry 310 comprises a call list as fleet data 304, When a fleet of mobile stations receive the call list, a group call is made possible within the fleet of mobile stations. Further entry 310 comprises a pointer 308 that may point to additional fleet data located at other place. Using a separate location for addition data is a practical implementation when the fleet data exceeds a certain size. Optionally, entry 310 may contain device info 306 that may indicate a list of possible networks or mobile stations that can receive the fleet data in entry 310 as understood by those skilled in the art certain fleet data, especially those affecting the operation of a mobile station, may not be pushed to a set of restrictive mobile stations. Other info 312 may include authorization or authentication information 314 including who, when or how a particular set of fleet data may be accessed or simply a list of authorized entities. To be more specific, a business has a product promotion that is only available to certain users at a specific time in a specific geographic area. To distribute the promotion information, the business must be in the list of authorized entities so as to be able to access the fleet managing system. The promotion information may have been pre-edited and stored in fleet data 304 or created on demand. Device information 306 may provide a list of mobile stations that the promotion information should be distributed to. Additionally, pointers in 316 provide means to access additional information pertinent to a set of particular fleet data. It should be understood that fleet data table 300 is demonstrated as an example, there are many ways and varieties of data formats of actual fleet data, depending upon actual implementation preference in a specific configuration. In addition, the fleet data may be created on demand. That means the fleet data can be created and then edited when needed. As described above, the contents in actual fleet data or formats thereof do not affect the operations of the present invention. One of the key features in the present invention is that a set of fleet data can be securely obtained and pushed to a selective set of mobile stations such that the mobile stations upon receiving the fleet data will act accordingly.

Returning to FIG. 2A, compiled and linked version of a program of the present invention is loaded in and works as fleet server module 208. Memory 206 provides necessary space for fleet server module 208 to function as designated. Provisioning interface 202 provides necessary security means for accepting a request from a provisioning entity 212 to push a set of fleet data to a fleet of mobile stations. In other words, a user sends the request, or fleet data request, from provisioning entity 212, the request prompts a challenge response from provisioning interface 202. To proceed the request, the user must answer the challenge response before provisioning entity 212 is integrated into the fleet managing system.

According to one embodiment, fleet server 200 is a part of a carrier infrastructure and may be conveniently accessed by a fleet manager terminal coupled directly to fleet server 200. In this case, the provisioning entity is the fleet manager terminal. Provisioning interface 202 returns a challenge for the entry of a set of predefined credential information, such as a username or a corresponding password, when the fleet data request to a fleet of mobile stations is made from the fleet manager terminal. If the entered credential information matches the predefined credential information that are preferably stored in memory 206, the request is permitted. An authorized user may thus use the fleet manager terminal to proceed with the request. The procedures may include determination of the desired mobile stations in the fleet, selection of desired fleet data and subsequently executions of the request by transferring or pushing the desired fleet data to the fleet.

According to another embodiment, the fleet data request is made from a computing device coupled to a landnet 220. The computing device may be a desktop computer 110 of FIG. 1. Given an IP address of fleet server 200, a request to establish a communication session to fleet server 200 can be made by the computing device using HTTPS. Preferably, the computing device runs an HTML browser that permits a link to fleet server 200 with the IP address. Upon the communication session being established, provisioning interface 202 returns a challenge response for the entry of a set of predefined credential information, an authorized user then must enter a set of correct credential information so as to proceed with the request to make the appropriate changes to the fleet of mobile stations.

According to still another embodiment, the fleet data request to a fleet of mobile stations is made from a computing device in a private network. The computing device may be desktop computer 124 of FIG. 1 and the private network may represent local network 120. Further coupled to the private network is a database server, such as 122 of FIG. 1, which comprises fleet data preferred and controlled by the private network or a private enterprise that owns the private network. As described before, this configuration is typically for enterprise-level management of fleet of mobile stations and the fleet data, typically sensitive or proprietary, can be initiated and pushed to the fleet of mobile stations concerned by the private entity via the carrier infrastructure. In other words, the fleet data can be only accessed by the designated computing device or other computing devices in the private network. The fleet data is then transferred to fleet server 200 via provision interface 202 that must clear the authorization of such data transfer by verifying a set credential information supplied from the private network. To ensure that the fleet data is securely transferred, the communication protocol between the database server and fleet server 200 is typically HTTPS that encrypts all the data in transit.

As shown in the figure, both fleet server 200 and proxy server 230 comprise an HTTP interface 210 and 222, respectively. It is understood that the HTTP interfaces are only needed when fleet server 200 and proxy server 230 communicate over a landnet using HTTP or HTTPS. When the communication protocol is other than HTTP or HTTPS, HTTP interface 210 and 222 can be readily replaced with other appropriate interfaces or simply vanished if fleet server 200 and proxy server 230 are in direct communication.

Server device 230 comprises a UDP interface 224 that couples to wireless network 240 via a carrier's infrastructure (not shown in the figure), a proxy server module 226 coupled between HTTP interface 222 and UDP interface 224, an account manager 228 and a plurality of user accounts. It should be noted that Internet 220 and wireless network 240 correspond to, respectively, landnet 100 and airnet 102 of FIG. 1 according to one embodiment of the present invention. Further, it will be appreciated that the principles of the present invention can be used with a wide variety of wireless networks. Examples of the wireless networks include Cellular Digital Packet Data (CDPD), Global System for Mobile Communications (GSM), Code Division Multiple Access (CDMA) and Time Division Multiple Access (TDMA).

Server module 226 performs traditional server processing as well as protocol conversion processing from one communication protocol to another communication protocol. According to the present embodiment, the protocol conversion processing, sometimes implemented in a separate module referred to as a mapper herein, includes protocol conversion between UDP and HTTP, wherein the conversion is a data mapping relationship. It is understood to those skilled in the art that UDP interface 224 can be readily replaced by other interface module when the wireless network 240 uses another communication protocol.

Working with server module 226, account manager 228 manages a plurality of user accounts 214 for all the mobile stations serviced by server device 240. FIG. 4 shows an exemplary structure 400 of the user accounts 214. Each of the mobile stations is assigned a device ID 402. Device ID 402 can be a phone number of the device or a combination of an IP address and a port number, for example: 204.163.165.132:01905 where 204.163.165.132 is the IP address and 01905 is the port number. The device ID is further associated with a subscriber ID 404 that is typically initiated and authorized by a carrier in proxy server device 240 as part of the procedures to activate a subscriber account for a mobile station. The subscriber ID may take the form of, for example, 861234567-10905_pn.mobile.att.net by AT&T Wireless Service, it is nevertheless a unique identification to the particular mobile station. In other words, each of mobile stations serviced by proxy server 250 has a unique device ID that corresponds to a respective user account therein. Preferably, each user account is also assigned a group ID 406 to facilitate the fleet management. For example, mobile stations belonging to a corporation subscriber are all assigned to a same group ID "C". When the corporation subscriber decides to update certain data to its mobile stations, the group ID "C" may be embedded in the data, thereby mobile stations with the same group ID are affected and the rest of mobile stations serviced by proxy server 230 are intact. However, it should be pointed out that the group ID is not necessary but may make the invention work more efficiently. There are many ways to push data to a selective group of mobile stations by using, for example, the device IDs or the subscriber IDs.

Each record in data structure 400 further comprises user info 408. User info 408 may include the account configuration information, for example, device ID "6508171453" is a mobile phone that is pre-configured for a CDPD network and, probably, may be provided with an option to switch to a GSM network if necessary. Further user info 408 may include pointers or linkages 410 to other account related information, such as encryption schemes, call plan and customer service information. Using pointers or linkages 410 eliminates the need of having all the information in one place. Optionally, a special code may be placed in user info 408 of data structure 400 for a special mobile station. With the special code, the mobile station may become a mobile station manager terminal to cause fleet server 200 to push a set of fleet data to a fleet. The detailed operations with the mobile station manager terminal will be described below when appropriate.

Although it is presented herein that account structure 400 is located in proxy server 230, it is generally understood that the user accounts may be actually stored in another network server linked to proxy server 230. In other words, the user accounts can be kept in a database that is physically placed in any computing device coupled to proxy server 230 and can be collected or fetched therefrom. Hence the scope of the present invention is not limited to proxy server that must have user accounts physically therein.

Returning now to FIG. 2B, there is shown a mobile station 250 in communication with proxy server 230 via wireless data network 240. The following description is focused on mobile station 250 and its associated account in proxy server 230. However, it shall be appreciated by those skilled in the art that the description is equally applied to all mobile stations in communication with proxy server 230.

Mobile station 250 includes a UDP interface 252 that couples to carrier network 240 via a Radio Frequency (RF) transceiver (not shown in the figure) to receive incoming and outgoing data signals. Device identifier (ID) storage 254 supplies a device ID to UDP interface 252. The device ID identifies a specific code that is associated with mobile station 250 and directly corresponds to the device ID in the user account provided in proxy server 250. In addition, mobile station 250 includes a client module 256 that performs many of the processing tasks performed by mobile station 250 including establishing a communication session with proxy server 230 via carrier network 240, requesting and receiving data from carrier network 240, displaying information on a display screen 260 thereof, and receiving user input from keypad 262 as well. The client module 256 is coupled to UDP interface 252 for the establishment of a communication session and the requesting and receiving of data. Additionally, the client module 256 operates, among other things, a browser 264, commonly referred to as micro-browser, requiring much less computing power and memory than the well-known HTML browser does. The micro-browser is, preferably, a Handheld Device Markup Language (HDML) micro-browser from Unwired Planet, Inc. located at 800 Chesapeake Drive, Redwood City, Calif. 94063. Additional details on accessing a (proxy) server device from a mobile station including a (micro) browser is described in commonly assigned U.S. patent application Ser. No. 08/570,210 entitled "METHOD AND ARCHITECTURE FOR AN INTERACTIVE TWO-WAY DATA COMMUNICATION NETWORK" by Alain Rossmann which is hereby incorporated by reference in its entirety.

Figure 5A:
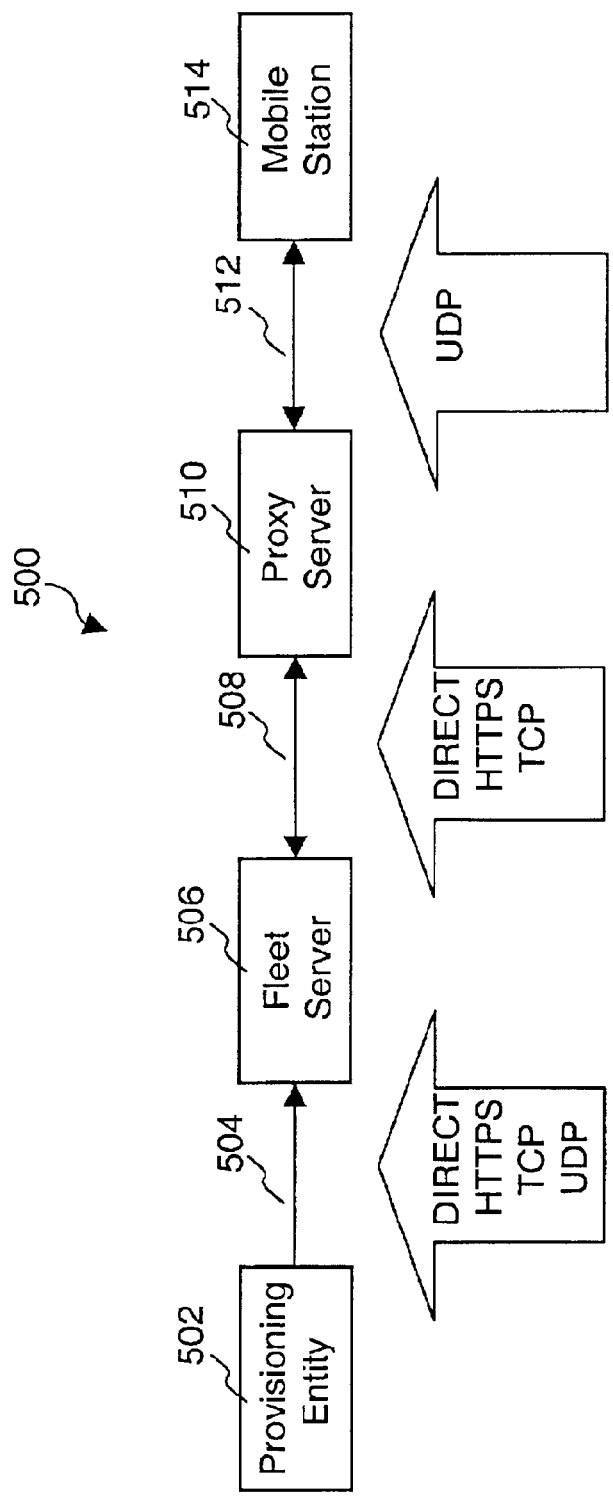
FIG. 5A shows an overview of the fleet managing system having multilevel transitive trust between pairs of entities.

Referring now to FIG. 5A, there is shown an overview of the fleet managing system 500 according to one embodiment of the present invention. FIG. 5 shall be understood in conjunction with FIGS. 1, 2A and 2B. As indicated above, provisioning entity 502 can be a fleet management terminal, a computing device, a mobile station or an electronic device providing access means to fleet server 506.

According to one embodiment, provisioning entity 502 is a fleet management terminal that is coupled directly to fleet server 506. The communication 504 between the terminal and fleet server 506 is private and the security of the information exchange therebetween can be guaranteed. According to another embodiment, provisioning entity 502 is a computing device coupled to fleet server 506 via the Internet using a communication protocol, preferably a secure data transfer protocol, such as HTTPS. Further provisioning entity 502 can be remotely located with respect to fleet server 506 and still access fleet server 506 via the Internet. Using the computing device, an authorized user may send a request to push a set of fleet data, either located in a database communicating with fleet server 506 or edited on demand, to a fleet of mobile stations of interest. It is understood that the communication 504 between the computing device and fleet server 506 is secure over the Internet using HTTPS. It is a similar case, as described before, communication 504 is secure when provisioning entity 502 is a private server in a private network through which a computing device can transfer a set of private fleet data in the private server to fleet server 506 via the Internet.

Nevertheless, provisioning entity 502 may be a mobile station as well. As indicated above, a request to push fleet data may be made in a mobile station. To prevent from unauthorized executing such request from any mobile stations, a mobile station can be specially configured to have the commanding power. For example, a corresponding user account, in proxy server 512 of the commanding mobile station is assigned a special code that triggers an entry to access a command to cause a selective set of fleet data to be pushed to a fleet of mobile stations.

Figure 5B:
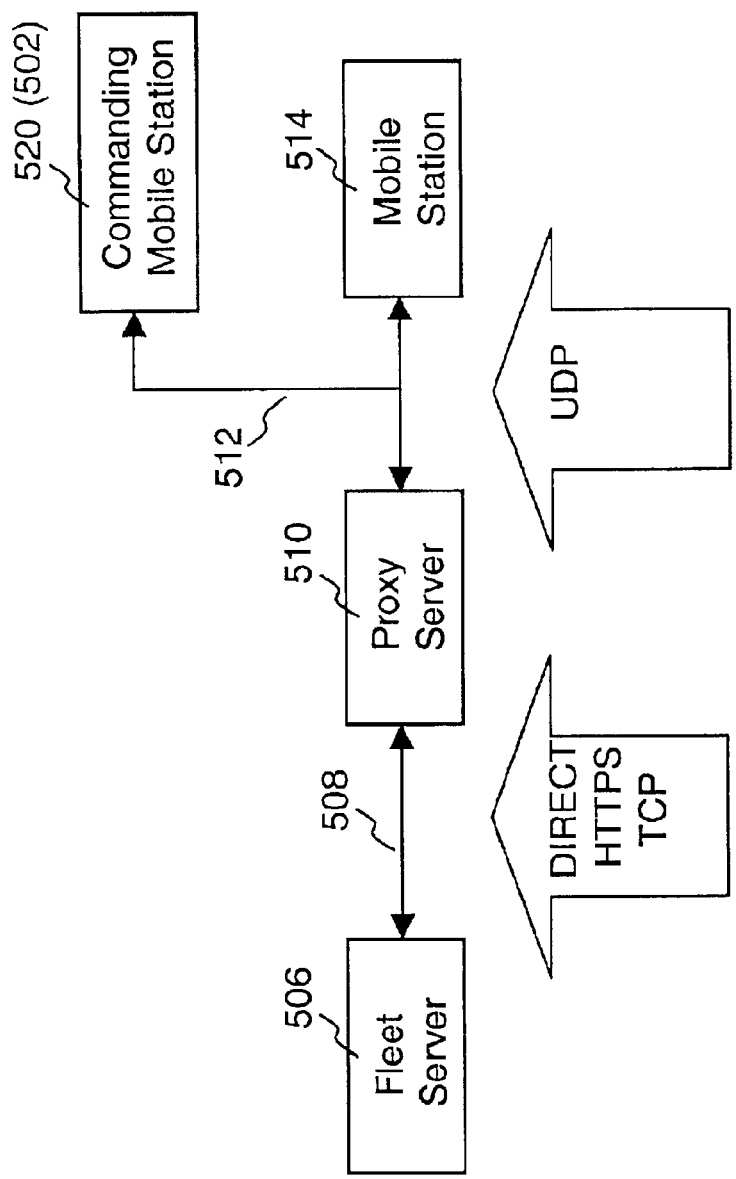
FIG. 5B shows a different view of FIG. 5A when the provisioning entity is one of the mobile stations serviced by the proxy server.

To be more specific, referring now to FIG. 5B, there is shown a request to push fleet data made from commanding mobile station 520 which represents provision entity 502 of FIG. 5A. Commanding mobile station 520 sends a request message to proxy server 510 to establish a communication session therewith. The request message typically comprises an IP address of proxy server 510, for example, www.xyz.com. The request message further includes a device ID of commanding mobile station 520 and is verified by an account manager with a user account database (both shown in FIG. 2A) in proxy server 510 when the request message is received therein. If the device ID is matched with a corresponding one in the user account, commanding mobile station 520 is thus authorized. The account manager further examines if commanding mobile station 520 has the special commanding power by looking up the set-up configuration information. Meanwhile commanding mobile station 520 and proxy server 510 exchange encrypt keys and authenticate each other to generate a session key according to a mutually acceptable encryption scheme such that the communication session established between commanding mobile station 520 and proxy server 510 is secure. Additional detailed description of establishing a secure communication session between a mobile station and a proxy server is described in commonly assigned U.S. patent application Ser. No. 08/966,988 entitled "Method and System for Secure Lightweight Transactions in Wireless Data Networks" by Hanqing Liao et al, which is hereby incorporated by reference in its entirety.

With the established secure communication session and the permission to access fleet data, commanding mobile station 520 allows a user to navigate to the fleet data in fleet server 506 using, for example, the micro-browser from Unwired Planet. Upon executing a predefined key in commanding mobile station 520, the fleet data is fetched therefrom by the proxy server module and pushed to a fleet of mobile stations.

To be even more specific, FIGS. 6A–6E illustrate a sequence of exemplary displays from commanding mobile station. Display 602 shows a list of options that a user may access. It is assumed that the user decides to send a call list to a group of sales directors to have a group call at a specific time. By moving cursor 604 to "managing a fleet" and pressing a predefined key, such as a "#" key in a phone keypad existing in most of the cellular phones, a request to establish a secure communication session is made therefrom. As described above, the request may include an IP address to the proxy server that services the commanding mobile station. The commanding mobile station then is responded with a challenge response requiring a username or a password as a new display 606 in FIG. 6B. Upon entering the correct username and password, the authentication process between the commanding mobile station and the proxy server is initiated till a secure communication session is fully established. In other words, the commanding mobile station and the proxy server now trust each other. In FIG. 6C, display 608 shows a list of pre-prepared information. Generally the commanding mobile station is not equipped with a full functional keyboard and hence is not used for editing lengthy information. Of course, the commanding mobile station, just like any computing devices coupled to the Internet, can certainly create and edit a new message if desired or equipped with necessary convenient input/editing means. Nevertheless, among the pre-prepared information, the user chooses the first item "Call List" as indicated by the cursor 604. After pressing the predefined key, a next display 610 in FIG. 6D shows a list of pre-prepared groups to which the selected pre-prepared data is to be disseminated. It has been described that there are many ways to identify a group of mobile stations including the use of the group ID, device ID and subscriber ID. The list of pre-prepared groups means that a certain number of mobile stations have been grouped into an identity, such as "a sales group". It is understood that there might be some overlapping, which means some mobile stations on one list may be on another list. It is preferable to have one list selected at one time. According to FIG. 6D, the user has selected "sales directors", that may mean the selected pre-prepared data "Call List" will be delivered to the mobile stations used by each of the sales directors. FIG. 6E shows a display 612 for a confirmation from the user. Once the user executes the "Yes" choice, "Call List" will be pushed to "Sales Directors".

It is understood to those skilled in the art that FIGS. 6A–6E are only for illustrative purpose for the commanding mobile station that is practically no different from other mobile stations. In other words, each of the mobile stations may be configured to function as the commanding mobile station. Also it is understood that FIGS. 6A–6E may be applied to displays by the landline computing devices as well.

Returning now to FIG. 5A, it is now appreciated that communication path 504 between provisioning entity 502 and fleet server 506 can be always made secure. Once provisioning entity 502 is authorized by fleet server 506, provisioning entity 502 can proceed to request to push a set of fleet data via the proxy server module to a fleet of mobile stations.

Similarly communication path 508 between fleet server 506 and proxy server 510 is always secure. Typically, proxy server 510 is in a carrier infrastructure. If fleet server 506 is also in the carrier infrastructure, then communication path 508 is guaranteed secure. However, if fleet server 506 is remotely located with respect to but coupled to proxy server 510, both proxy server 510 and fleet server 506 run a secure communication protocol, such as HTTPS, thus data transferred between proxy server 510 and fleet server 506, are always secure.

As described indirectly above, communication between proxy server 510 and mobile station 514 can be always secure because a pair of encryption keys are exchanged therebetween to establish a secure session. In other words, each mobile station establishes a secure communication session respectively with proxy server 510 and all data transferred in the established sessions are respectively and independently encrypted according to each session encryption key created therefor. The detailed descriptions of pushing data from a proxy server (device) to a mobile station (device) are contained in commonly assigned U.S. patent application Ser. No. 09/071,235 entitled "Method and System for Integrating Narrowband and Wideband Data Transports" by Stephen S. Boyle, et al. which is hereby incorporated by reference in its entirety.

It can be appreciated by now that the fleet managing system operates a secure communication path from provisioning entity 502 to mobile station 514 by maintaining a series of transitive trusts. That means, if a trusts that a communication comes from b and b trusts that a communication comes from c, then a can trust that a communication come from c if b asserts that the communication does come from c. It is, consequently, only necessary to establish a trust between pairs of entities in the fleet managing system to create a series of transitive trusts across the system. Thus in this architecture, if a trust is respectively established between the mobile stations and the proxy server; between the proxy server and the fleet server; and between the fleet server and each provisioning entity, then the entire system can be trusted.

Figure 7A:
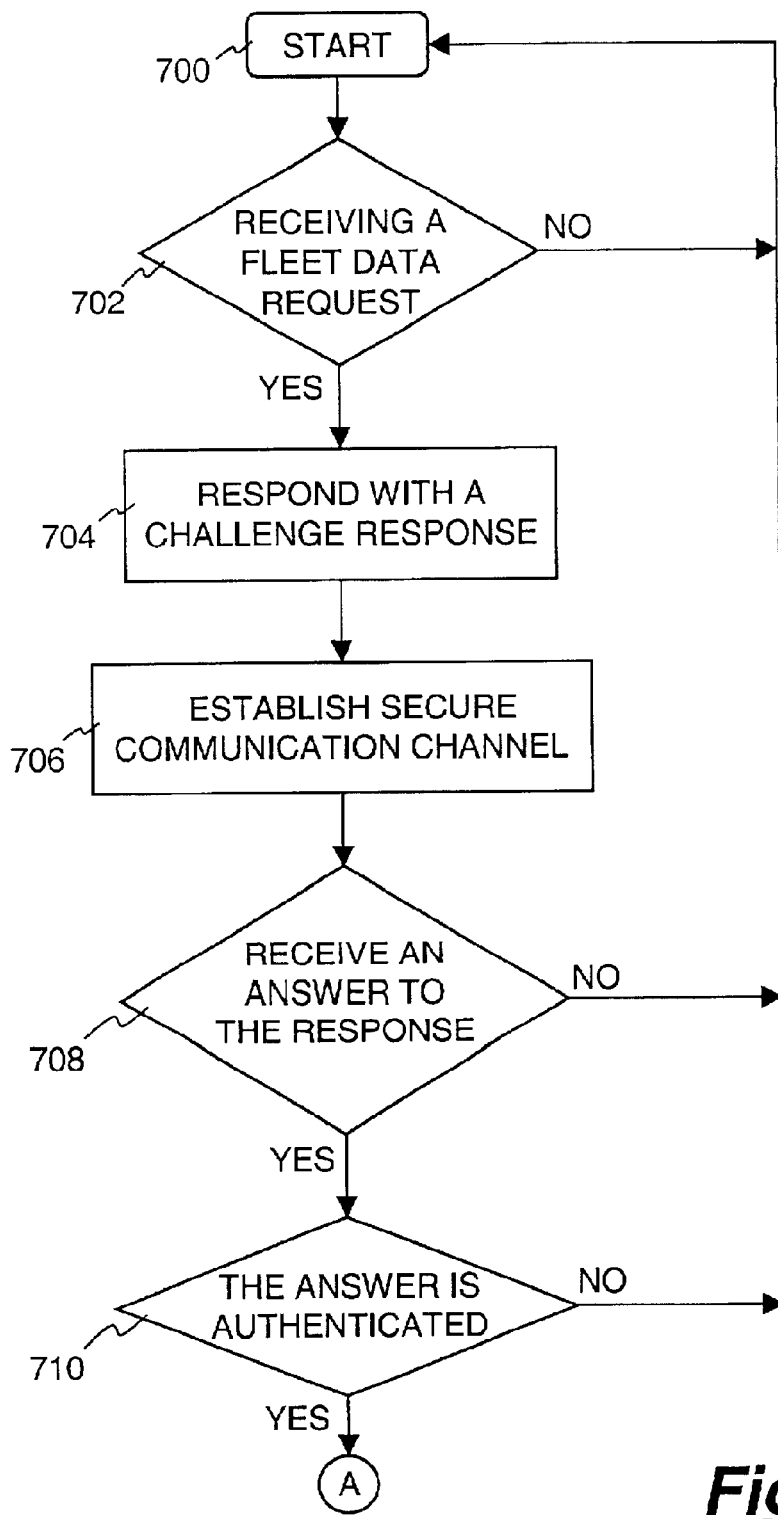
FIGS. 7A and 7B show a systematic process flowchart of the fleet managing system according to one embodiment of the present invention.
Figure 7B:
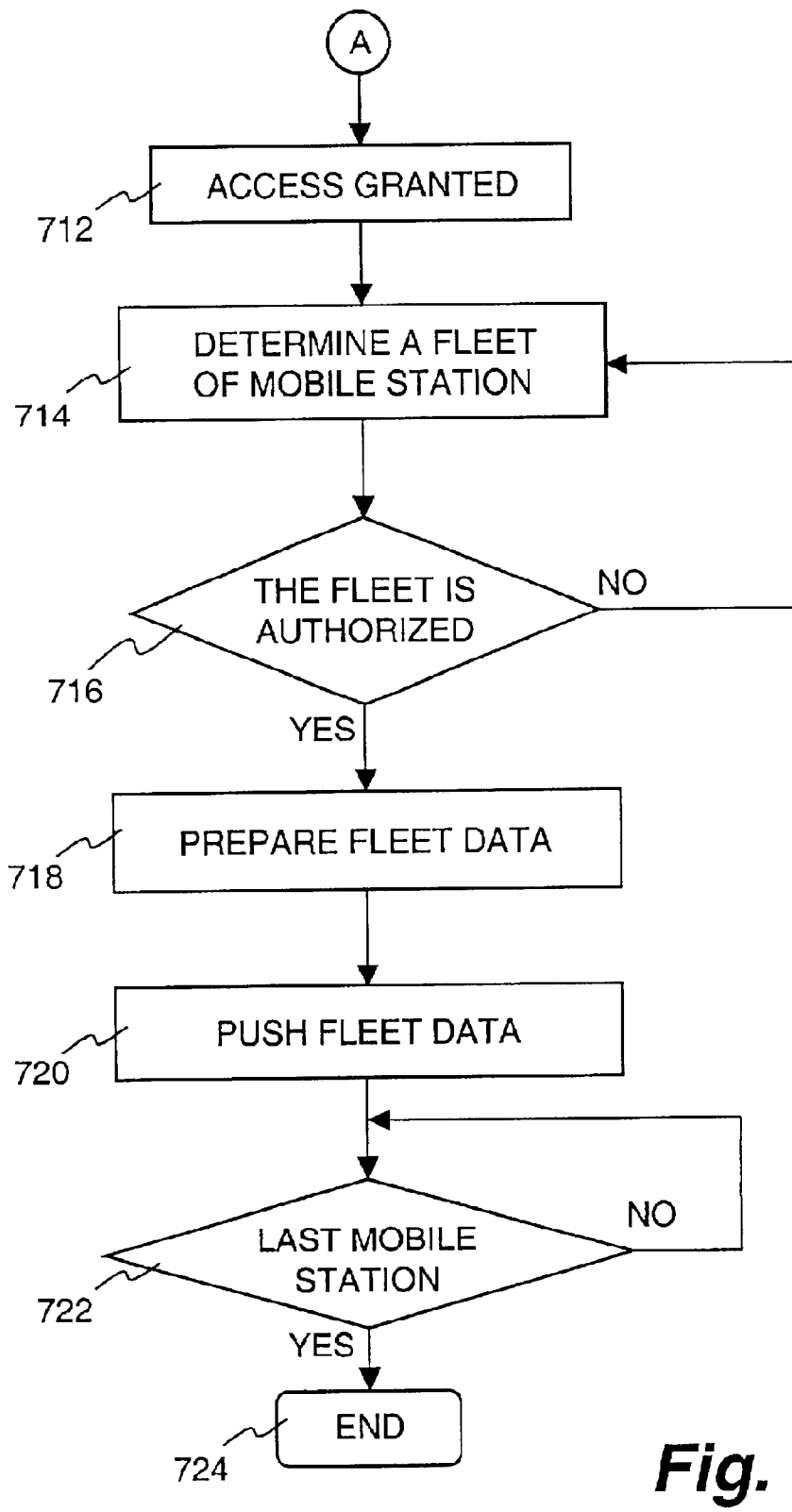

Referring now to FIGS. 7A and 7B, there are depicted a systematic data processing flowchart of the fleet managing system. The flowchart should be understood in conjunction with the previous figures. At 702, the fleet managing system receives a fleet data request at the provisioning interface. As described before, the fleet data request may comprises an IP address or fleet data depending on the actual system configuration and comes from a provisioning entity. The request generally causes an establishment of a secure communication path or session between the provisioning entity and the provisioning interface at 704. Under the secure communication environment, the provisioning interface responds with a challenge response that requires credential information from the provisioning entity at 706.

At 708, an answer, i.e. credential information, from the provisioning entity to the challenge response is expected before the provisioning interface acts further. At 710, the received credential information is verified by a comparison against corresponding predefined credential information. If there is a disagreement or mismatch between the supplied credential information and predefined credential information, the original request from the provisioning entity is discarded otherwise a trust is therefore established between the provisioning entity and the provisioning interface. At 712, the fleet data request from the provisioning entity is granted. In other words, the provisioning entity is now integrated into or a part of the fleet managing system.

At 714, a user of the provisioning entity can proceed to prepare the execution of pushing fleet data to a fleet of mobile stations by first determining the members in the fleet. For example, the user may use a predefined list or create a new list by using the device ID of each of the mobile stations of concern. At 716, the selected mobile stations are determined if all are authorized and serviced by the proxy server. Typically, the selected mobile stations are examined against their corresponding user accounts. If it is found that one of the selected mobile stations does not correspond to one of the user accounts, the user will be required to reenter the correct information to rectify the mobile stations in the fleet. At 718, the user is provided to prepare the fleet data. As described before, the user may choose one from a list of pre-prepared messages or create/edit a new one. At 720, the request to push the fleet data to the fleet of mobile stations is executed by pressing a predefined key. The fleet data is pushed out, respectively and sequentially, to each of the mobile stations in the fleet at 722.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

What is claimed is:

1. A system comprising:
   a proxy server coupled to a wireless network, to enable a plurality of mobile stations on the wireless network to communicate with processing systems on a landnet, the proxy server communicating with the mobile stations over the wireless network; and
   a fleet server coupled to communicate with the proxy server, to store and control access to fleet data, and to authenticate a request from a provisioning entity to push the fleet data to the plurality of the mobile stations;
   wherein the proxy server pushes the fleet data to the plurality of mobile stations over the wireless network only if the request is authenticated by the fleet server.

2. A system as recited in claim 1, wherein the provisioning entity is a computing device coupled directly to the fleet server, the fleet server prompting the provisioning entity with a challenge response for credential information when the request is received.

3. A system as recited in claim 1, wherein the fleet server enables the provisioning entity to determine the fleet data and the plurality of the mobile stations.

4. A system as recited in claim 1, wherein the proxy server communicates with the mobile stations over the wireless network using a first communication protocol, and the fleet server communicates with the proxy server using a second communication protocol.

5. A system as recited in claim 4, wherein the fleet server comprises:
   a storage device to store fleet data;
   a fleet server module to control access to the fleet data in the storage device and to communicate with the proxy server module using the second communications protocol; and
   a provisioning interface to authenticate a request from a provisioning entity to push the fleet data to the plurality of the mobile stations;
   wherein the proxy server pushes the fleet data to the plurality of mobile stations over the wireless network only if the request is authenticated by the provisioning interface.

6. A system as recited in claim 5, wherein the proxy server comprises an account manager to manage a plurality of user accounts, each corresponding to one of the mobile stations, wherein the proxy server pushes the fleet data to the plurality of mobile stations over the wireless network only if the request is authenticated by the provisioning interface and verified by the account manager.

7. A system as recited in claim 4, wherein the proxy server comprises a mapper to perform protocol mapping from the first communication protocol to the second communication protocol and from the second communication protocol to the first communication protocol.

8. A system as recited in claim 7, wherein the second communication protocol is a secure data transfer protocol.

9. A system as recited in claim 8, wherein the second communication protocol is Secure HyperText Transfer Protocol (HTTPS).

10. A system as recited in claim 4, wherein the provisioning entity is a computing device coupled to the fleet server over the landnet using the second communication protocol, the fleet server prompting the provisioning entity with a challenge response for credential information when the request is received, through the landnet, at the provisioning interface.

11. A system as recited in claim 4, wherein the provisioning entity is a computing device coupled to a private server comprising private fleet data, the private server communicating with the fleet serve over the landnet using the second communication protocol, the computing device causing the private fleet data in the private server to be transferred, over the landnet, to a storage device in the fleet server.

12. A system as recited in claim 11, wherein the proxy server module pushes the private fleet data from the fleet server to the plurality of the mobile stations upon the provisioning entity authenticating the private fleet data.

13. A system as recited in claim 1, wherein the provisioning entity is a mobile station coupled to the proxy server over the wireless data network.

14. A system as recited in claim 13, wherein:
   the proxy server comprises an account manager to manage a plurality of user accounts, each corresponding to one of the mobile stations;
   the mobile station comprises a device identification; and
   the mobile station is granted access to the fleet server only if the device identification is verified by the account manager with the plurality of user accounts.

15. A fleet server to manage a plurality of mobile stations on a wireless network, the plurality of mobile stations communicating with a proxy server, the fleet server comprising:

a storage device to store fleet data;

a fleet server module to control access to the fleet data in the storage device and to communicate with the proxy server; and a provisioning interface to authenticate a request from a provisioning entity to push the fleet data to the plurality of the mobile stations, and to provide the fleet data to the proxy server, to be pushed to the plurality of mobile stations over the wireless network, only if the request is authenticated.

16. A fleet server as recited in claim 15, wherein the provisioning entity is a computing device coupled directly to the fleet server, the fleet server prompting the provisioning entity with a challenge response for credential information when the request is received.

17. A fleet server as recited in claim 15, wherein the fleet server enables the provisioning entity to determine the fleet data and the plurality of the mobile stations.

18. A fleet server as recited in claim 15, wherein the provisioning entity is a mobile station coupled to the proxy server over the wireless data network.

19. A fleet server as recited in claim 18, wherein:

the proxy server comprises an account manager to manage a plurality of user accounts, each corresponding to one of the mobile stations;

the mobile station comprises a device identification; and the mobile station is granted access to the fleet server only if the device identification is verified by the account manager with the plurality of user accounts.

20. A fleet server as recited in claim 15, wherein the plurality of mobile stations communicate with the proxy server using a first communication protocol, and the fleet server module communicates with the proxy server using a second communication protocol.

21. A fleet server as recited in claim 20, such that the proxy server comprises an account manager to manage a plurality of user accounts, each corresponding to one of the mobile stations, wherein the proxy server pushes the fleet data to the plurality of mobile stations over the wirkless network only if the request is authenticated by the provisioning interface and verified by the account manager.

22. A fleet server as recited in claim 20, wherein the second communication protocol is a secure data transfer protocol.

23. A fleet server as recited in claim 20, wherein the second communication protocol is Secure HyperText Transfer Protocol (HTTPS).

24. A fleet server as recited in claim 20, wherein the provisioning entity is a computing device coupled to the fleet server over a landnet using the second communication protocol, the fleet server prompting the provisioning entity with a challenge response for credential information when the request is received, through the landnet, at the provisioning interface.

25. A fleet server as recited in claim 20, wherein the provisioning entity is a computing device coupled to a private server comprising private fleet data, the private server communicating with the fleet server over a landnet using the second communication protocol, the computing device causing the private fleet data in the private server to be transferred, over the landnet, to a storage device in the fleet server.

26. A fleet server as recited in claim 25, wherein the proxy server pushes the private fleet data from the fleet server to the plurality of the mobile stations upon the provisioning entity authenticating the private fleet data.

27. A method of securely managing a plurality of mobile stations on a wireless network, the method comprising:

receiving, by a fleet server, a request from a provisioning entity to push fleet data to the plurality of the mobile stations;

authenticating the provisioning entity in response to the request using the fleet server;

verifying the plurality of the mobile stations against a plurality of user accounts using the fleet server; and responding to the request by causing the fleet data to be pushed from the fleet server to the plurality of the mobile stations.

28. A method as recited in claim 27, wherein the provisioning entity is a mobile station on the wireless network.

29. A method as recited in claim 27, wherein responding to the request by causing the fleet data to be pushed to the plurality of the mobile stations comprises pushing the fleet data from a proxy server to each of the plurality of the mobile stations over the wireless network using a wireless communication protocol.

30. A method as recited in claim 27, wherein authenticating the provisioning entity comprises:

sending a challenge response from a fleet managing system to the provisioning entity in response to the request; and allowing the provisioning entity to access the fleet managing system in response to receiving correct credential information from the provisioning entity responsive to the challenge response.

31. A method as recited in claim 27, wherein the request comprises a link request to establish a secure communication session with a provisioning interface and an IP address of the provisioning interface.

32. A method as recited in claim 31, wherein the provisioning entity operates a browser, the browser using a secure communication protocol to establish the secure communication session with the provisioning interface.

33. A method as recited in claim 32, further comprising enabling navigation to the fleet data using the browser.

* * * * *